(12) United States Patent
Boer et al.

(10) Patent No.: US 8,014,267 B2
(45) Date of Patent: Sep. 6, 2011

(54) METHODS AND APPARATUS FOR BACKWARDS COMPATIBLE COMMUNICATION IN A MULTIPLE INPUT MULTIPLE OUTPUT COMMUNICATION SYSTEM WITH LOWER ORDER RECEIVERS

(75) Inventors: Jan Boer, Odijik (NL); Bas Driesen, Dongen (NL); Tim Schenk, Eindhoven (NL); Allert Van Zelst, Woerden (NL)

(73) Assignee: Agere Systems Inc., Allentown, PA (US)

( * ) Notice: Subject to any disclaimer, the term of this patent is extended or adjusted under 35 U.S.C. 154(b) by 801 days.

(21) Appl. No.: 10/562,619

(22) PCT Filed: Jun. 30, 2004

(86) PCT No.: PCT/US2004/021026
§ 371 (c)(1),
(2), (4) Date: May 26, 2006

(87) PCT Pub. No.: WO2005/006588
PCT Pub. Date: Jan. 20, 2005

(65) Prior Publication Data
US 2006/0252386 A1  Nov. 9, 2006

Related U.S. Application Data

(60) Provisional application No. 60/483,719, filed on Jun. 30, 2003.

(51) Int. Cl.
*H04J 11/00* (2006.01)
*H04L 27/04* (2006.01)
*H03C 7/02* (2006.01)

(52) U.S. Cl. .................. 370/208; 375/299; 455/101

(58) Field of Classification Search .......... 370/206–210, 370/329–330, 334, 343–344; 455/101, 103, 455/112, 63.4, 450; 375/267, 299
See application file for complete search history.

(56) References Cited

U.S. PATENT DOCUMENTS 6,802,035 B2 * 10/2004 Catreux et al. ................ 714/746
(Continued)

OTHER PUBLICATIONS

Shin et al., "A New Training Symbol Structure to Enhance the Peformance of Channel Estimation for MIMO-OFDM Systems," IEEE International Conference on Acoustics, Speech, and Signal Processing Proceedings (ICASSP), vol. 1 of 6, pp. IV397-IV400 (Apr. 6, 2003).

(Continued)

*Primary Examiner* — Kwang B Yao
*Assistant Examiner* — Candal Elpenord
(74) *Attorney, Agent, or Firm* — Ryan, Mason & Lewis, LLP

(57) ABSTRACT

A method and apparatus are disclosed for transmitting symbols in a multiple antenna wireless communication system, such that the symbols can be interpreted by a lower order receiver (i.e., a receiver having a fewer number of antennas than the transmitter). For example, subcarriers from one or more symbols can be transmitted such that each of the subcarriers are active on only one of the antennas at a given time. In one implementation, the subcarriers are diagonally loaded across logically adjacent antennas. The symbols can include one or more long training symbols and optionally a SIGNAL field that indicates a duration that a receiver should defer until a subsequent transmission. In this manner, a transmitter in accordance with the present invention may be backwards compatible with a lower order receiver and a lower order receiver can interpret the transmitted symbols or defer for an appropriate duration.

30 Claims, 5 Drawing Sheets

$$t_l^1 = \begin{bmatrix} 0 & 1 & 0 & 0 & 1 & 0 & 0 & 1 & 0 & 0 & -1 & 0 & 0 & -1 & 0 & \cdots \end{bmatrix}$$

$$t_l^2 = \begin{bmatrix} 0 & 0 & -1 & 0 & 0 & 1 & 0 & 0 & -1 & 0 & 0 & -1 & 0 & 0 & -1 & \cdots \end{bmatrix}$$

$$t_l^3 = \begin{bmatrix} 0 & 0 & 0 & -1 & 0 & 0 & -1 & 0 & 0 & 1 & 0 & 0 & -1 & 0 & 0 & \cdots \end{bmatrix}$$

U.S. PATENT DOCUMENTS

| | | | |
|---|---|---|---|
| 7,065,156 B1* | 6/2006 | Kuchi | 375/299 |
| 7,103,115 B2* | 9/2006 | Li | 375/340 |
| 7,110,350 B2* | 9/2006 | Li et al. | 370/204 |
| 7,203,245 B1* | 4/2007 | Murphy | 375/260 |
| 7,233,625 B2* | 6/2007 | Ma et al. | 375/260 |
| 7,248,638 B1* | 7/2007 | Banister | 375/267 |
| 7,269,127 B2* | 9/2007 | Mody et al. | 370/210 |
| 7,352,688 B1* | 4/2008 | Perahia et al. | 370/206 |
| 7,453,793 B1* | 11/2008 | Jones et al. | 370/203 |
| 2002/0193146 A1* | 12/2002 | Wallace et al. | 455/562 |
| 2003/0002471 A1* | 1/2003 | Crawford et al. | 370/343 |
| 2003/0072255 A1* | 4/2003 | Ma et al. | 370/208 |
| 2003/0076777 A1* | 4/2003 | Stuber et al. | 370/206 |
| 2003/0087673 A1* | 5/2003 | Walton et al. | 455/562 |
| 2004/0022174 A1* | 2/2004 | Li et al. | 370/203 |
| 2004/0047296 A1* | 3/2004 | Tzannes et al. | 370/252 |
| 2004/0121730 A1* | 6/2004 | Kadous et al. | 455/13.3 |
| 2004/0131012 A1* | 7/2004 | Mody et al. | 370/210 |
| 2004/0192216 A1* | 9/2004 | Marzetta et al. | 455/67.14 |
| 2005/0002461 A1* | 1/2005 | Giannakis et al. | 375/259 |
| 2005/0233709 A1* | 10/2005 | Gardner et al. | 455/101 |

OTHER PUBLICATIONS

Sun et al. "Training Sequence Assisted Channel Estimation for MIMO OFDM," Wireless Communications and Networking, pp. 38-43 (Mar. 16, 2003).

* cited by examiner $$t_l = [01-1-111-11-11-1-1-1-1-111-1-11-11-111110\cdots$$
$$\cdots 011-1-111-11-1111111-1-111-11-11111]$$

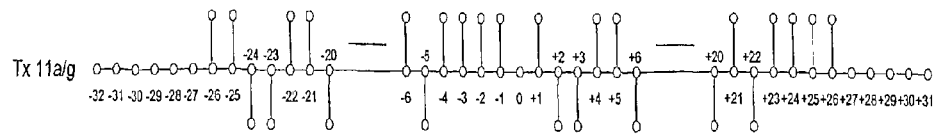
FIG. 3
PRIOR ART
$$t_l^1 = \begin{bmatrix} 0 & 1 & 0 & 0 & 1 & 0 & 0 & 1 & 0 & 0 & -1 & 0 & 0 & -1 & 0 & \cdots \end{bmatrix}$$
$$t_l^2 = \begin{bmatrix} 0 & 0 & -1 & 0 & 0 & 1 & 0 & 0 & -1 & 0 & 0 & -1 & 0 & 0 & -1 & \cdots \end{bmatrix}$$
$$t_l^3 = \begin{bmatrix} 0 & 0 & 0 & -1 & 0 & 0 & -1 & 0 & 0 & 1 & 0 & 0 & -1 & 0 & 0 & \cdots \end{bmatrix}$$
FIG. 4
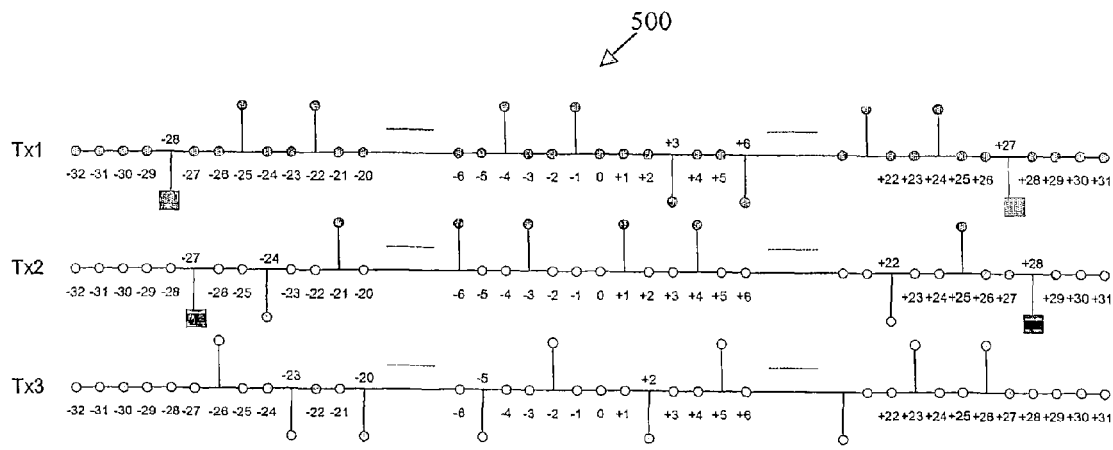
FIG. 5

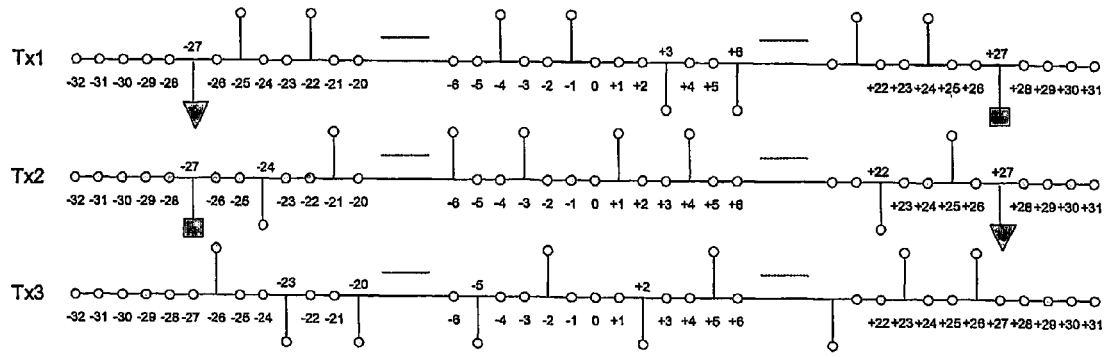
FIG. 6
$$\begin{matrix} T_x^1 \\ T_x^2 \\ T_x^3 \end{matrix} \begin{bmatrix} 1 & 0 & 0 & 1 & 0 & 0 & 1 & \cdots & 0 & 0 & 1 \\ 0 & 1 & 0 & 0 & 1 & 0 & 0 & \cdots & 1 & 0 & 0 \\ 0 & 0 & 1 & 0 & 0 & 1 & 0 & \cdots & 0 & 1 & 0 \end{bmatrix}$$
$$R_x \begin{bmatrix} H_1^1 & H_2^2 & H_3^3 & H_4^1 & H_5^2 & H_6^3 & H_7^1 & \cdots & H_{50}^2 & H_{51}^3 & H_{52}^1 \end{bmatrix}$$
FIG. 7
FIG. 8
PRIOR ART

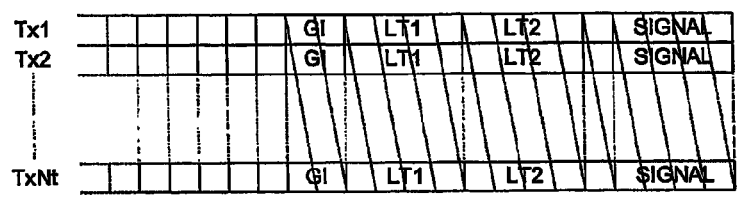
FIG. 9
$$T_x^1 \begin{bmatrix} 1 & 0 & 1 & 0 & 1 & 0 & 1 & \cdots & 0 & 1 & 0 \\ 0 & 1 & 0 & 1 & 0 & 1 & 0 & \cdots & 1 & 0 & 1 \end{bmatrix}$$
$$R_x^1 \begin{bmatrix} H_1^1 & 0 & 0 & H_4^2 & 0 & 0 & H_7^1 & \cdots & 0 & 0 & H_{52}^2 \\ 0 & H_2^2 & 0 & 0 & H_5^1 & 0 & 0 & \cdots & H_{50}^2 & 0 & 0 \\ 0 & 0 & H_3^1 & 0 & 0 & H_6^2 & 0 & \cdots & 0 & H_{51}^1 & 0 \end{bmatrix}$$
FIG. 10
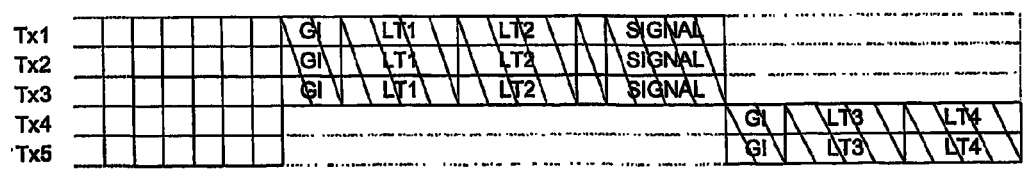
FIG. 11

METHODS AND APPARATUS FOR BACKWARDS COMPATIBLE COMMUNICATION IN A MULTIPLE INPUT MULTIPLE OUTPUT COMMUNICATION SYSTEM WITH LOWER ORDER RECEIVERS

CROSS REFERENCE TO RELATED APPLICATIONS

This application claims the benefit of U.S. Provisional Application No. 60/483,719, filed Jun. 30, 2003, incorporated by reference herein. The present application is also related to United States Patent Application, entitled "Method and Apparatus for Communicating Symbols in a Multiple Input Multiple Output Communication System Using Diagonal Loading of Subcarriers Across a Plurality of Antennas," filed contemporaneously herewith and incorporated by reference herein.

FIELD OF THE INVENTION

The present invention relates generally to channel estimation techniques for a wireless communication system, and more particularly, to channel estimation techniques for a Multiple Input Multiple Output Orthogonal Frequency Division Multiplexing (OFDM) communication system.

BACKGROUND OF THE INVENTION

Most existing Wireless Local Area Network (WLAN) systems based upon OFDM modulation comply with either the IEEE 802.11a or IEEE 802.11g standards (hereinafter "IEEE 802.11a/g"). See, e.g., IEEE Std 802.11a-1999, "Part 11: Wireless LAN Medium Access Control (MAC) and Physical Layer (PHY) Specification: High-Speed Physical Layer in the Five GHz Band," incorporated by reference herein. In order to support evolving applications, such as multiple high-definition television channels, WLAN systems must be able to support ever increasing data rates. Accordingly, next generation WLAN systems should provide increased robustness and capacity.

Multiple transmit and receive antennas have been proposed to provide both increased robustness and capacity. The increased robustness can be achieved through techniques that exploit the spatial diversity and additional gain introduced in a system with multiple antennas. The increased capacity can be achieved in multipath fading environments with bandwidth efficient Multiple Input Multiple Output (MIMO) techniques.

A MIMO-OFDM system transmits separate data streams on multiple transmit antennas, and each receiver receives a combination of these data streams on multiple receive antennas. The difficulty, however, is in distinguishing between and properly receiving the different data streams at the receiver. A variety of MIMO-OFDM decoding techniques are known, but they generally rely on the availability of accurate channel estimations. For a detailed discussion of MIMO-OFDM decoding techniques, see, for example, P. W. Wolniansky at al., "V-Blast: An Architecture for Realizing Very High Data Rates Over the Rich-Scattering Wireless Channel," 1998 URSI International Symposium on Signals, Systems, and Electronics (September, 1998), incorporated by reference herein.

In order to properly receive the different data streams, MIMO-OFDM receivers must acquire a channel matrix through training. This is generally achieved by using a specific training symbol, or preamble, to perform synchronization and channel estimation techniques. The training symbol increases the total overhead of the system. In addition, a MIMO-OFDM system needs to estimate a total of $N_t N_r$ channels, where $N_t$ is the number of transmitters and $N_r$ is the number of receivers, which could lead to an $N_t$ increase of the long training length.

A need therefore exists for a length-efficient training symbol. A further need exists for a training symbol having a minimum length, preferably equal to the length of a training symbol in a conventional Single Input Single Output OFDM (SISO-OFDM) system. Yet another need exists for a method and system for performing channel estimation and training in a MIMO-OFDM system utilizing a signal that is orthogonal in the frequency domain or equally shift orthogonal in the time domain. A further need exists for a method and system for performing channel estimation and training in a MIMO-OFDM system that is compatible with current IEEE 802.11a/g standard (SISO) systems.

SUMMARY OF THE INVENTION

Generally, a method and apparatus are disclosed for transmitting symbols in a multiple antenna wireless communication system, such that the symbols can be interpreted by a lower order receiver (i.e., a receiver having a fewer number of antennas than the transmitter). For example, subcarriers from one or more symbols can be transmitted using a plurality of antennas in the multiple antenna wireless communication system, such that each of the subcarriers are active on only one of the antennas at a given time. In one exemplary implementation, the subcarriers are diagonally loaded across logically adjacent antennas. The symbols can include one or more long training symbols and optionally a SIGNAL field that indicates a duration that a receiver should defer until a subsequent transmission. In this manner, a transmitter in accordance with the present invention may be backwards compatible with a lower order receiver and a lower order receiver can interpret the transmitted symbols and defer for an appropriate duration.

A more complete understanding of the present invention, as well as further features and advantages of the present invention, will be obtained by reference to the following detailed description and drawings.

BRIEF DESCRIPTION OF THE DRAWINGS

FIG. 3 illustrates a frequency domain representation of a conventional IEEE 802.11a/g long training symbol;

FIG. 4 illustrates long training symbols incorporating features of the present invention for a MIMO-OFDM system having three transmit antennas;

FIG. 5 illustrates a frequency domain representation of a MIMO-OFDM long training symbol in accordance with a first embodiment of the invention;

FIG. 6 illustrates a frequency domain representation of a MIMO-OFDM long training symbol in accordance with a second embodiment of the invention;

FIG. 7 illustrates the subcarriers for three exemplary transmit antennas when a data sequence of all ones is transmitted in accordance with the diagonal loading techniques of the present invention;

FIG. 8 illustrates a conventional IEEE 802.11a/g preamble structure;

FIG. 9 illustrates a MIMO-OFDM preamble structure incorporating features of the present invention;

FIG. 10 provides an example of scalability in accordance with the present invention for a MIMO-OFDM system employing two transmit antennas and three receiver antennas;

FIG. 11 illustrates an exemplary MIMO-OFDM preamble structure for a system with five transmit antennas.

DETAILED DESCRIPTION

Figures 1, 2:
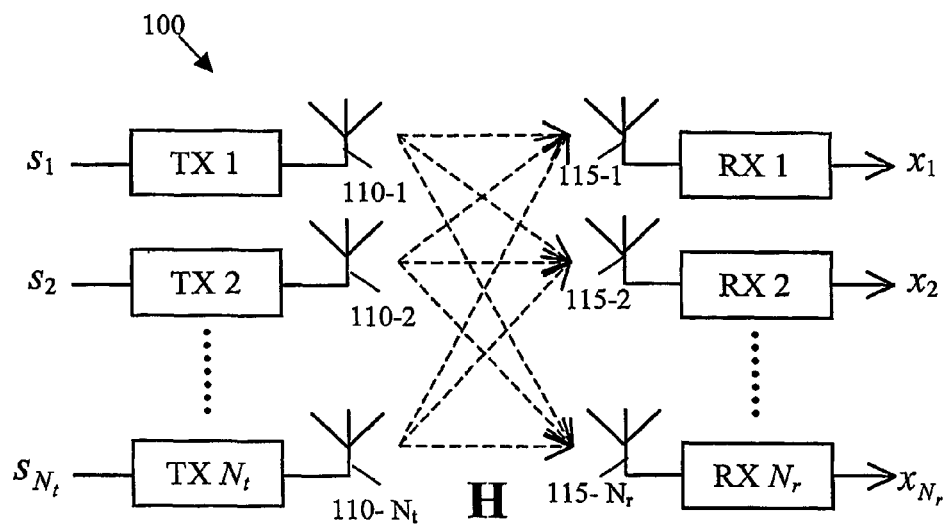
FIG. 1 illustrates a conventional MIMO-OFDM system consisting of $N_t$ transmitters, $N_r$ receivers.
FIG. 2 illustrates a conventional long training symbol according to the IEEE 802.11a/g standard consisting of 64 subcarriers, seen at the input of the Inverse Fast Fourier Transform (IFFT)

The present invention is directed to a backwards compatible MIMO-OFDM system. FIG. 1 illustrates an exemplary MIMO-OFDM system 100 comprising source signals $S_1$ to $S_{Nt}$, transmitters $TX_1$ to $TX_{Nt}$, transmit antennas 110-1 through 110-$N_t$, receive antennas 115-1 through 115-$N_r$, and receivers $RX_1$ to $RX_{Nr}$. The MIMO-OFDM system 100 transmits separate data streams on the multiple transmit antennas 110, and each receiver RX receives a combination of these data streams. In order to extract and detect the different data streams $S_1$ to $S_{Nt}$, the MIMO-OFDM receivers RX must acquire the channel matrix, H, as shown in FIG. 1, through training.

The IEEE 802.11a/g standard specifies a preamble in the frequency domain for OFDM-based Wireless Local Area Network systems consisting of short and long training symbols. The short training symbols are for frame detection, Automatic Gain Control (AGC) and coarse synchronization. The long training symbols are used for fine synchronization and channel estimation. The long training symbol according to the IEEE 802.11a/g standard consists of 64 subcarriers and is specified as shown in FIG. 2.

FIG. 3 illustrates a frequency domain representation of the IEEE 802.11a/g long training symbol of FIG. 2. The present invention recognizes that since only 52 of the 64 subcarriers in the long training symbol are modulated, there are additional subcarriers available to accommodate channel estimation techniques for a MIMO-OFDM system.

The ideal training symbol for a MIMO-OFDM system is orthogonal in the frequency domain or equally shift orthogonal in the time domain. According to one aspect of the present invention, the long training symbol of the IEEE 802.11a/g standard is made orthogonal by diagonally loading the modulated subcarriers on the different transmit antennas. The diagonal loading of subcarriers may also be referred to as subcarrier interleaving or multiplexing the subcarriers across the transmitters. It is noted that the diagonally loading techniques described here for long training symbols, also apply to short training symbols to overcome possible beamforming effects, as would be apparent to a person of ordinary skill in the art.

FIG. 4 illustrates long training symbols for a MIMO-OFDM system in accordance with the present invention, where the subcarriers from the training symbol of FIG. 3 are diagonally loaded across three exemplary transmit antennas. FIG. 4 illustrates the first 16 subcarriers seen at the input of the Inverse Fast Fourier Transform (IFFT) for each of three antennas, $t_l^1$ through $t_l^3$, where $t_l^n$ stands for the long training symbol transmitted on the n-th transmit antenna. In the example shown in FIG. 4, each subsequent subcarrier is transmitted on an adjacent antenna in a round robin fashion. Thus, only one-third of the subcarriers are transmitted on each antenna and the remaining subcarriers are nulled.

The channel estimates associated with the nulled carriers on each antenna created by the diagonal loading can be obtained at the receiver using a form of interpolation. In particular, the channel estimates belonging to the nulled subcarriers of a specific transmit antenna can be obtained through interpolation by utilizing neighboring subcarriers that are not nulled. Generally, as long as the root-mean-square (RMS) time delay spread (IDS) of the channel is limited or, equally, the coherence bandwidth is larger than a number that depends on the actual number of transmitters used, the channel estimation error due to interpolation will in general be small.

As indicated above, when subcarriers are diagonally loaded on multiple transmit antennas in accordance with the present invention, however, additional subcarriers become nulled on each transmit antenna. As a result, the outer subcarriers of the spectrum defined by the OFDM system (FIG. 3) no longer have neighboring subcarriers. For example, when subcarriers −26 and −25 in the conventional long training symbol of FIG. 3 are diagonally loaded on multiple transmit antennas (TX3 and TX1, respectively), in a manner described below in conjunction with FIG. 5, the subcarrier −26 is nulled on transmit antennas 1 and 2, and the subcarrier −25 is nulled on transmit antennas 2 and 3. Thus, on antenna 1, subcarrier −26 no longer has at least one subcarrier on each side that is not nulled.

If the outer subcarriers in the conventional long training symbol of FIG. 3 are nulled as part of the diagonal loading on multiple transmit antennas and do not have at least one subcarrier on each side that are not nulled, they cannot be interpolated, but must be extrapolated. Extrapolation, however, creates larger errors than interpolation, and a larger error in the channel estimation of the outer subcarriers impairs the performance of the system.

Thus, according to another aspect of the invention, a diagonally loaded long training symbol, based on the IEEE 802.11a training symbol of FIG. 3, is utilized in conjunction with one or more additional subcarriers at the edge of the spectrum. The additional subcarriers are positioned in the spectrum to ensure that all subcarriers that are nulled for diagonal loading have at least one subcarrier on each side that is not nulled. As noted above, since the training technique defined by the IEEE 802.11a/g standard only modulates 52 out of the 64 subcarriers, additional spectrum is available to specify additional subcarriers.

For example, it can be shown that the addition of four extra training subcarriers, two at each side of the spectrum, conforms with the IEEE 802.11a/g transmit mask defined in the IEEE 11a/g standard. A MIMO-OFDM 100 system with two transmit antennas employs two extra subcarriers, one at each side of the spectrum, and a MIMO-OFDM system with three transmit antennas can employ four extra subcarriers, two at each side of the spectrum, in order to ensure that all nulled subcarriers of the original system have at least one subcarrier located on each side that is not nulled and thereby enabling the interpolation of the original subcarriers positioned at the edges of the spectrum. Thus, the additional subcarriers at the edges of the spectrum overcome the problem of extrapolation and enable an interpolation-based channel estimation technique.

FIG. 5 is a schematic diagram of exemplary MIMO-OFDM long training symbols 500 in accordance with the present invention for a three transmit antenna system, with additional subcarriers positioned at the spectrum's edges (+27 and −28 on $TX_1$; +28 and −27 on $TX_2$) to provide neighboring subcarriers to the nulled subcarriers (+26 and −26 of $TX_1$ and $TX_2$). $TX_3$ does not require additional subcarriers since the outer subcarriers (+26 and −26) are not null.

The extra subcarriers at the edges are modulated in such a way that the peak-to-average power ratio (PAP) is lowest to minimize the effect of non-linearity of the power amplifiers. The original subcarriers associated with the original IEEE 802.11a training symbol of FIG. 3 have round arrowheads and the additional subcarriers added in accordance with the present invention are illustrated in FIG. 5 with square arrowheads.

The exemplary MIMO-OFDM long training symbols 500 shown in FIG. 5 provide an optimal solution for a three transmit antenna MIMO-OFDM system 100, with four additional subcarriers (two on each side of the spectrum) to be able to make an accurate estimation of the outer subcarriers on each antenna. The first long training symbol and the second long training symbol of each antenna would, in this case, be identical.

FIG. 6 is a schematic diagram of exemplary MIMO-OFDM long training symbols 600 in accordance with an alternate embodiment of the present invention for a three transmit antenna system. The long training symbols 600 shown in FIG. 6 include just two additional subcarriers (+27 on TX1 and −27 on TX2). The embodiment of FIG. 6 recognizes that each IEEE 802.11a/g preamble includes two long training symbols, LT1 and LT2, as discussed further below in conjunction with FIG. 8. The embodiment shown in FIG. 6 uses just two additional subcarriers, but interchanges the additional subcarriers at the first and the second long training symbols LT1 and LT2. In the exemplary embodiment of FIG. 6, the first long training symbol LT1 uses the outer subcarriers (−27 of TX2 and +27 of TX1) and the second long training symbol uses the outer subcarriers (−27 of TX1 and +27 of TX2). In the notation of FIG. 6, the subcarriers associated with the original IEEE 802.11a training symbol of FIG. 3 have round arrowheads, the additional subcarriers active for the first long training symbol LT1 are illustrated with square arrowheads and the additional subcarriers that are active for the second long training symbol LT2 are illustrated in FIG. 6 with triangle arrowheads.

Thus, the first long training symbol LT1 provides neighboring subcarriers to nulled subcarrier −26 of TX2 and +26 of $TX_1$ and the second long training symbol LT2 will provide neighboring subcarriers to nulled subcarrier +26 of $TX_2$ and −26 of $TX_1$. These nulled subcarriers, however, would have a less accurate channel estimate since only one of the two training symbols are providing a neighboring subcarrier and, thus, the signal-to-noise ratio (SNR) or the mean squared error (MSE) of the channel estimate will be lower respectively higher than in the case of the other subcarriers.

Backwards Compatibility

A MIMO-OFDM system preferably needs to be backwards compatible to the current IEEE 802.11a/g standard in order to coexist with existing systems. The use of an IEEE 802.11a/g long training symbol in a MIMO-OFDM system as disclosed herein provides for a MIMO-OFDM system that is backwards compatible and that can coexist with IEEE 802.11a/g systems and MIMO-OFDM systems of other orders (i.e., comprising a different number of transmitters). As used herein, backwards compatibility means that a MIMO-OFDM system needs to be able to (i) support the current standards; and (ii) defer (standby) for the duration of a MIMO-OFDM transmission. Any system with $N_r$ receive antennas that is not able to receive the data transmitted in a MIMO format is able to defer for the duration of the transmission since it is able to detect the start of the transmission and retrieve the length (duration) of this transmission.

A MIMO-OFDM system 100 employing a long training symbol can communicate in a backwards-compatible way with an IEEE 802.1 a/g system in two ways. First, it is possible to scale back to one antenna to transmit data according to the IEEE 802.11a/g standard. Secondly, the IEEE 802.11a/g receiver is able to interpret the MIMO transmission from all the active transmitters as a normal OFDM frame. In other words, an IEEE 802.11a/g receiver can interpret a MIMO transmission of data, in a manner that allows the IEEE 802.11a/g receiver to defer for the duration of the MIMO transmission. A MIMO-OFDM system 100 that communicates in a backwards-compatible way with a SISO system should also be able to scale other parameters of the system in addition to the number of antennas being used.

For example, a MIMO system needs to be able to vary the modulation scheme and the coding rate of a MIMO system to a modulation scheme and coding rate compatible with a lower order system, such as a SISO system. In one adaptive implementation, a feedback mechanism is provided between a receiver and the transmit branches of a transmitter to adapt one or more of the antenna configuration (number of antennas), modulation scheme and encoding rate to improve link performance.

In addition, a MIMO-OFDM system which uses a diagonally loaded (or interleaved) training symbol can diagonally load the rest of the header and the data symbols on different transmit antennas.

FIG. 7 illustrates the subcarriers for three exemplary transmit antennas $T_x^1$ to $T_x^3$ when a data sequence of all ones is transmitted in accordance with the present invention, where $H_n^t$ represents the channel coefficient belonging to the n-th subcarrier and the t-th transmitter. In this case, the receiver $R_x$ processes the received signal as the channel coefficients belonging to a single channel, even though the different channel coefficients belong to different actual channel realizations. Each active transmit antenna transmits a portion of the total transmission to the IEEE 802.11a/g receiver.

FIG. 8 illustrates a conventional IEEE 802.11a/g preamble structure 800 and FIG. 9 illustrates a MIMO-OFDM preamble structure 900 incorporating features of the present invention. As shown in FIGS. 8 and 9, LT1 and LT2 are the long training symbols, respectively, and SIGNAL is the SIGNAL-field. A MIMO system that uses at least one long training field of the IEEE 802.11a/g preamble structure of FIG. 8 repeated on different transmit antennas as shown in FIG. 9 can easily scale back to a one-antenna configuration to achieve backwards compatibility. A number of variations are possible for making the long training symbols orthogonal. In one variation, the long training symbols can be diagonally loaded across the various transmit antennas, in the manner described above. In another variation, 802.11a long training sequences are repeated in time on each antenna. For example, in a two antenna implementation, a long training sequence, followed by a signal field is transmitted on the first antenna, followed by a long training sequence transmitted on the second antenna.

In yet another variation, a time orthogonal preamble structure is employed, whereby the 802.11 preamble is transmitted on each antenna at the same time followed by one or more additional training symbols. Time orthogonality is maintained by employing a phase shift to distinguish each of the additional training symbols. For example, in a two antenna implementation, one additional training symbol is transmitted on each antenna, each with opposite polarity. A further variation employs FDM based MIMO-OFDM preamble structures based on orthogonality in the frequency domain. Generally, in an implementation with N antennas, the subcarriers of the long training symbols are grouped into N groups, such as blocked groups or interleaved groups, and each group is transmitted on a different antenna over time, such that each subcarrier is active on only one antenna at a given time.

If an IEEE 802.11a/g system is unable to receive a MIMO-OFDM transmission, the IEEE 802.11a/g receiver will need to defer (standby) for the duration of a MIMO-OFDM packet. Thus, in order to be backwards compatible, the IEEE 802.11a/g-based receivers need to be able to detect the preamble employed by the present invention and interpret the SIGNAL-field of the packet to be able to extract the length of the packet. The length of an 802.11a transmission can be found in the header in the SIGNAL-field. A MIMO transmission in accordance with one aspect of the invention employs a similar field to address the transmission parameters. An 802.11a system needs to be able to detect and decode this field in a MIMO transmission. The preamble employed by the present invention can be made backwards compatible with current IEEE 802.11a/g-based systems by including the long training field and the SIGNAL field on the different transmit antennas. The length specified in the SIGNAL-field for a MIMO-OFDM transmission should be set equal to the actual duration of the packet, so that the IEEE 802.11a/g-based receive can read the packet length and defer for the duration of the MIMO-OFDM transmission. The length information in the SIGNAL-field of a MIMO transmission should include the length of the additional long training sequences. In this manner, an 802.11a system can defer for the duration of the MIMO transmission. A MIMO receiver will subtract the length of the additional long training sequences to obtain the correct length of the data.

A MIMO-OFDM system also needs to be able to translate the SIGNAL-field into the actual length of the packet in bytes. For this to occur, a MIMO-OFDM system must have additional information of the system, such as the number of antennas. This additional information can be included in the reserved bit in the SIGNAL-field and in the additional subcarriers (when the SIGNAL-field is also appended with extra subcarriers or if additional signal fields are employed). In addition, if the length at the transmitter is defined to be in line with the number of OFDM symbols in the MIMO-OFDM case, then some freedom remains.

By specifying the duration in number of OFDM symbols, the amount of data can only be coarsely specified in multiples of the number of transmitter OFDM symbols. In a three transmitter MIMO-OFDM system, for example, the data contained in the specified duration is equal to a multiple of three OFDM symbols. However, the data does not need to be exactly in line with a multiple of number of transmitters OFDM symbols. The data may span, for example, only the final OFDM symbol of the first transmitter, leaving the other final OFDM symbols of the remaining two transmitters empty. Furthermore, the data may span only part of the final OFDM symbol of the first transmitter. The latter one can still be specified using the additional freedom that is left in specifying the duration of a MIMO-OFDM message, since the specified length does not need to be specified in exactly multiple of OFDM symbols.

The final OFDM symbol might instead be specified in number of contained data bytes, which will result in a duration equal to a whole number of OFDM symbols. The number of final OFDM symbols left empty needs to be additionally specified and is referred to as padding OFDM symbols. In a three transmit MIMO-OFDM system, the number of OFDM padding symbols can be one or two. The padding symbols in a MIMO-OFDM transmission could be specified using additional subcarriers in the SIGNAL-field, similar to the long training symbols or they could be specified using the reserved bits in the SERVICE-field.

Additionally, the number of bytes contained in the final data OFDM symbol can be specified, which inherently specifies the number of padding bits in this symbol. However, a MIMO-OFDM transmission can also contain padding symbols and, since these symbols cannot be extracted from the LENGTH and RATE-field, they should instead be additionally specified.

Furthermore, a MIMO-OFDM employing a long training symbol and SIGNAL-field can be made scalable to different MIMO-OFDM configurations. For example, a MIMO-OFDM system with three transmit antennas can easily be scaled back to a MIMO-OFDM system with two transmit antennas. Additionally, a MIMO-OFDM system with only two receive antennas can train the channel and interpret the SIGNAL-field of a MIMO-OFDM transmission with three transmit antennas, and therefore is able to defer for the duration of the packet (similar to the technique above for the IEEE 802.11a/g receiver). A MIMO-OFDM system can thus coexist with an IEEE 802.11a/g system and lower order MIMO-OFDM systems.

A MIMO-OFDM system employing a long training symbol must know the number of transmit antennas beforehand to be scaleable, since the number of transmit antennas provides an indication to the MIMO-OFDM receiver of which channel coefficient belongs to which transmit antenna. FIG. 10 provides an example for a MIMO-OFDM system employing two transmit antennas $T_x^1$ and $T_x^2$ and three receiver antennas $R_x^1$, $R_x^2$ and $R_x^3$, here only $R_x^1$ is depicted. Once the receiver knows the antenna configuration of the transmitter, the receiver can reorder the coefficients and estimate the corresponding channels.

A diagonally loaded SIGNAL-field, however, can be detected and decoded even without knowing the number of transmit antennas. The SIGNAL-field will be of even better quality than the receive data since every receive antenna receives the same data and this can be combined using Maximum-Ratio Combining (MRC) techniques.

In a further variation, the SIGNAL-field can include information (with the use of extra subcarriers) indicating the number of transmit antennas and the number of OFDM padding symbols to the receiver. As previously indicated, for a 2×2 MIMO-OFDM system, two additional subcarriers are needed and, for a 3×3 MIMO-OFDM system, four additional subcarriers are needed to be able to sufficiently estimate the nulled subcarriers at the edges of the spectrum. Two extra subcarriers result in two extra available bits and four extra subcarriers means four extra available bits.

As indicated above, the reserved bit in the SIGNAL-field can be used to specify the type of system (i.e., either a SISO-OFDM or a MIMO-OFDM system). The first extra bit resulting from the additional subcarriers can be used to distinguish between two and three transmit antennas. The second extra bit can be used to specify the number of OFDM padding symbols (the options are one or two padding symbols for three transmitters). As these two extra bits cannot be encoded with the original SIGNAL-field, they are less robust than the other SIGNAL-field bits. The two remaining bits, however, can then be used to add extra robustness by implementing a one-error correcting block code. The two remaining bits could also be used for additional specification information, such as that needed when a higher order MIMO-OFDM system is considered. It is also useful to note that when a similar frame structure is adopted for MIMO-OFDM systems as for IEEE 802.11a/g systems, then more information can be stored in the reserved bits of the SERVICE-field.

A positive property of the diagonally loaded SIGNAL-field is the fact that it actually serves as a third long training symbol. Since after decoding and demodulation, the exact bits of the SIGNAL-field are known, they can then be used to train the channel. The SIGNAL-field in a SISO-OFDM system is always modulated and encoded in the same robust way using BPSK modulation and rate ½ convolutional encoding, which facilitates good reception. The SIGNAL-field in a MIMO-OFDM transmission is even more robust, since the SIGNAL-field is received by multiple antennas and thus can be combined in an optimal way. The use of the SIGNAL-field as a third long training symbol is therefore a feasible solution.

It should be noted, however, that the decoding of the SIGNAL-field takes time and increases the latency when used for channel estimation. When latency becomes a problem, a first channel estimate can be based on the two long training symbols and can be updated afterwards. Furthermore, when backwards compatibility and scalability are not of importance, the SIGNAL-field can instead be shift-diagonally loaded, as it does not need to serve frequency-offset estimation. It can be shown that shift-diagonally loading the training symbols and SIGNAL-field yields the best performance (see, B. Driesen, "MIMO OFDM Channel Estimation", Design Note, OSDN10A, 2003). With shift-diagonally loaded training symbols, the inherent interpolation error becomes smaller when each symbol is first processed separately and afterwards combined.

Additionally, it should be noted that when the training symbols are repeated on each antenna, they all should be able to transmit full power. With diagonally loaded training symbols, it is only necessary to be able to transmit them with power/Nt, resulting in less expensive power amplifiers (PAs). Furthermore, it is possible to transmit with additional power since the limiting factor most of the time is not the output power specified in the regulations, but that the PA itself cannot achieve these high output powers without distortion. This is a direct result of the technology utilized for the PA design.

FIG. 11 illustrates an exemplary MIMO-OFDM preamble structure 1100 for a system with five transmit antennas $T_x^1$ through $T_x^5$, where LT1 and LT2 are the long training symbols and SIGNAL is the SIGNAL-field. With diagonally loaded long training symbols and SIGNAL-field, a 3×3 MIMO-OFDM can be realized in the manner described above. Higher order MIMO-OFDM systems need extra training to make accurate channel estimation possible. Generally, one additional training symbol is needed for each additional transmit antenna. An exemplary 5×5 MIMO-OFDM system would therefore require four long training symbols and a SIGNAL-field. The channels belonging to the first three transmit antennas are estimated with the first two long training symbols and the SIGNAL-field, and the channels corresponding to the last two transmitters are estimated with the last two long training symbols.

Figure 12:
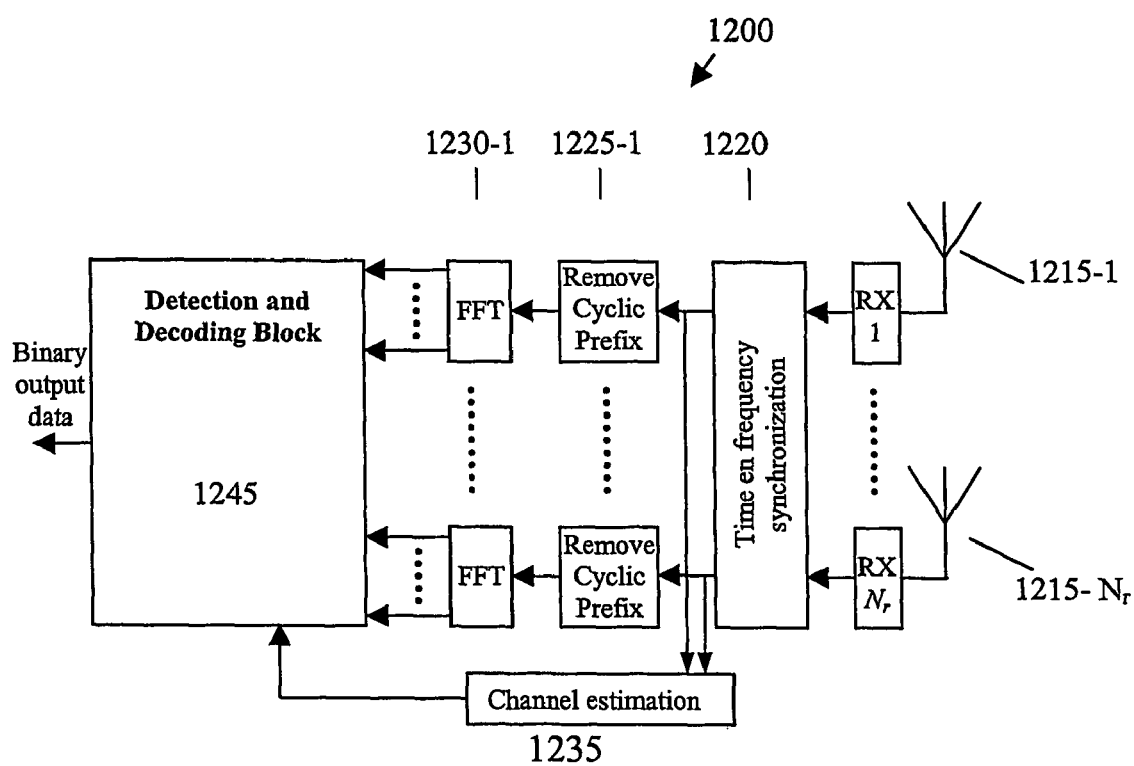
FIG. 12 is a block diagram of an exemplary MIMO-OFDM receiver in accordance with the present invention.

FIG. 12 is a block diagram of an exemplary MIMO-OFDM receiver 1200 incorporating features of the present invention. As shown in FIG. 12, the MIMO-OFDM receiver 1200 includes a plurality of receive antennas 1215-1 through 1215-$N_r$, and receivers $RX_1$ to Rr. Time and frequency synchronization is performed at stage 1220, and the synchronized received signal is applied to stage 1225 that removes the cyclic prefix and a channel estimation stage 1235. Once the cyclic prefix is removed at stage 1225, a fast fourier transform (FFT) is performed at stage 1230. A detection and decoding block 1245 performs MIMO detection (for $N_c$ subcarriers), phase drift and amplitude droop correction, demapping, deinterleaving, depunturing and decoding, using the channel estimate 1235.

If the MIMO-OFDM receiver 1200 must be backwards-compatible, the MIMO-OFDM receiver 1200 can perform channel estimation 1235 with equally diagonally loaded training symbols and SIGNAL-field as follows:

1. add two long training symbols to gain in SNR;
2. transform the resulting long training symbol to the frequency domain;
3. demodulate the long training symbol, resulting in incomplete channel estimates;
4. transform the SIGNAL-field to the frequency domain;
5. detect and decode the SIGNAL-field using the incomplete channel estimates;
6. demodulate the SIGNAL-field to generate another estimate of the incomplete channels;
7. sum and scale the demodulated SIGNAL-field and the demodulated training symbol (sum the incomplete channel estimates); and
8. compute the complete channel estimates through interpolation between the known subcarriers.

If the MIMO-OFDM receiver 1200 does not need to be backwards-compatible, the MIMO-OFDM receiver 1200 can perform channel estimation 1235 with shift-diagonally loaded training symbols and SIGNAL-field as follows:

1. transform the long training symbols and SIGNAL-field to the frequency domain;
2. demodulate the long training symbols;
3. perform separate interpolation of the long training symbols;
4. sum and scale the interpolated long training symbols;
5. detect and decode the SIGNAL-field;
6. demodulate the SIGNAL-field;
7. interpolate the SIGNAL-field; and
8. update channel estimates by combining the interpolated SIGNAL-field and training symbols.

It is to be understood that the embodiments and variations shown and described herein are merely illustrative of the principles of this invention and that various modifications may be implemented by those skilled in the art without departing from the scope and spirit of the invention.

We claim:

1. A method for receiving data on at least one receive antenna transmitted by a transmitter having a plurality of transmit antennas in a multiple antenna communication system, said method comprising the step of: receiving an indication of a duration to defer until a subsequent transmission, said indication transmitted such that said indication is capable of being interpreted by a lower order receiver by diagonally loading a SIGNAL field across said plurality of transmit antennas and by transmitting, on each of said plurality of transmit antennas, said SIGNAL field on a distinct set of subcarriers while setting the remaining subcarriers to a null value; and deferring for said indicated duration.

2. The method of claim 1, wherein said method is performed by a SISO receiver.

3. The method of claim 1, wherein said indication is transmitted in said SIGNAL field that complies with the 802.11 a/g standards.

4. The method of claim 1, wherein said duration is represented as a duration of said transmission.

5. The method of claim 1, wherein said duration is represented as a length of said transmission.

6. The method of claim 1, wherein said SIGNAL field indicates a number of said antennas in said multiple antenna communication system.

7. The method of claim 6, wherein said number of said antennas allows said multiple antenna communication system to be scalable.

8. The method of claim 6, wherein said number of said antennas allows a receiver to correlate channel coefficients with corresponding transmit antennas.

9. A receiver in a multiple antenna communication system having at least one transmitter having a plurality of transmit antennas, comprising: at least one receive antenna for receiving an indication of a duration to defer until a subsequent transmission, said indication transmitted such that said indication is capable of being interpreted by a lower order receiver by diagonally loading a SIGNAL field across said plurality of antennas; and by transmitting, on each of said plurality of transmit antennas, said SIGNAL field on a distinct set of subcarriers while setting the remaining subcarriers to a null value; and means for deferring for said indicated duration.

10. The receiver of claim 9, wherein said method is performed by a SISO receiver.

11. The receiver of claim 9, wherein said indication is transmitted in said SIGNAL field that complies with the 802.11 a/g standards.

12. The receiver of claim 9, wherein said duration is represented as a duration of said transmission.

13. The receiver of claim 9, wherein said duration is represented as a length of said transmission.

14. The receiver of claim 9, wherein said SIGNAL field indicates a number of said antennas in said multiple antenna communication system.

15. The receiver of claim 14, wherein said number of said antennas allows said multiple antenna communication system to be scalable.

16. The receiver of claim 14, wherein said number of said antennas allows said receiver to correlate channel coefficients with corresponding transmit antennas.

17. A method for transmitting data by a transmitter having a plurality of transmit antennas in a multiple antenna communication system, said method comprising the step of: determining an indication of a duration to defer until a subsequent transmission; and transmitting said indication of said duration to defer until said subsequent transmission, said indication transmitted such that said indication is capable of being interpreted by a lower order receiver by diagonally loading a SIGNAL field across said plurality of transmit antennas and by transmitting, on each of said plurality of transmit antennas, said SIGNAL field on a distinct set of subcarriers while setting the remaining subcarriers to a null value.

18. The method of claim 17, wherein said indication is transmitted in said SIGNAL field that complies with the 802.11 a/g standards.

19. The method of claim 17, wherein said duration is represented as a duration of said transmission.

20. The method of claim 17, wherein said duration is represented as a length of said transmission.

21. The method of claim 17, wherein said SIGNAL field indicates a number of said antennas in said multiple antenna communication system.

22. The method of claim 21, wherein said number of said antennas allows said multiple antenna communication system to be scalable.

23. The method of claim 21, wherein said number of said antennas allows a receiver to correlate channel coefficients with corresponding transmit antennas.

24. A transmitter in a multiple antenna communication system, comprising: N transmit antennas for transmitting at least one training symbol using at least one of said N transmit antennas and transmitting an indication of a duration to defer until a subsequent transmission, said indication transmitted such that said indication is capable of being interpreted by a lower order receiver by diagonally loading a SIGNAL field across said plurality of transmit antennas; and by transmitting, on each of said plurality of transmit antennas, said SIGNAL field on a distinct set of subcarriers while setting the remaining subcarriers to a null value.

25. The transmitter of claim 24, wherein said indication is transmitted in said SIGNAL field that complies with the 802.11 a/g standards.

26. The transmitter of claim 24, wherein said duration is represented as a duration of said transmission.

27. The transmitter of claim 24, wherein said duration is represented as a length of said transmission.

28. The transmitter of claim 24, wherein said SIGNAL field indicates a number of said antennas in said multiple antenna communication system.

29. The transmitter of claim 28, wherein said number of said antennas allows said multiple antenna communication system to be scalable.

30. The transmitter of claim 28, wherein said number of said antennas allows a receiver to correlate channel coefficients with corresponding transmit antennas.

* * * * *